2,870,150

MORPHOLINE ETHERS

Howard B. Wright and Marjorie B. Moore, Waukegan, Ill., assignors to Abbott Laboratories, North Chicago, Ill., a corporation of Illinois No Drawing. Application November 29, 1954
Serial No. 471,925

15 Claims. (Cl. 260—247.7)

The present invention relates to morpholine ethers and more particularly to alkoxy phenylphenyl ethers of morpholinoalkanols.

The ethers of our invention have the general formula

wherein M is a morpholino group, R is a lower alkylene group, and Ar is a phenylphenyl group. The morpholino group, as used herein, is the group $O(CH_2CH_2)_2N-$.

In general, the compounds of the present invention are prepared by forming an alkali or alkaline earth metal salt of a hydroxy aryl compound, and reacting the resultant salt of the hydroxy compound with a morpholino alkyl halide to produce the corresponding aryl ether of the morpholinoalkanol.

The invention is illustrated by the following specific examples:

EXAMPLE I

γ-Morpholinopropyl 4-phenylphenyl ether

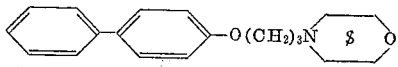

About 5.6 g. of potassium hydroxide is dissolved in about 150 cc. of refluxing ethanol to which about 17 g. of 4-hydroxydiphenyl is added. As soon as the said 4-hydroxydiphenyl is dissolved, about 16.3 g. of γ-morpholinopropyl chloride is added to the reaction mixture dissolved in about 50 cc. of ethanol and the reaction mixture refluxed for about 24 hours and cooled. The product is filtered and the precipitated product recrystallized from ethanol to produce the base γ-morpholinopropyl 4-phenylphenyl ether having a melting point of 97–98° C. On chemical analysis the base is found to contain 76.85% C. and 7.76% H as compared with a theoretical analysis of 76.74% C. and 7.79% H.

The hydrochloride salt of the foregoing base is prepared by dissolving the said base in ether and acidifying with hydrochloric acid. The crystalline hydrochloride salt recovered therefrom is found to be the hydrochloride salt of γ-morpholinopropyl 4-phenylphenyl ether and has a melting point of 230–232° C.

EXAMPLE II

γ-Morpholinopropyl 3-phenylphenyl ether

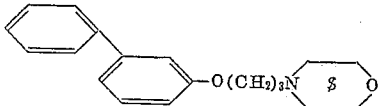

To about 150 cc. of ethanol containing 5.6 g. of potassium hydroxide is added 17 g. of m-phenylphenol and the reaction mixture refluxed until the reactants are completely dissolved. To the foregoing reaction mixture is added 16.3 g. of γ-morpholinopropyl chloride and the refluxing continued for 16 hours and thereafter the reaction mixture is cooled. The product is recovered by filtering the reaction mixture and removing the solvent by vacuum distillation. The oily residue is acidified and shaken with ether. The acidic phase is made strongly alkaline with sodium hydroxide and the oil which separates is extracted with ether. The ether phase is dried and the solvent removed by vacuum distillation. The residue product distills at a temperature of 182° C. at a pressure of 1.0 mm. and is found to consist of the base γ-morpholino-propyl 3-phenylphenyl ether. On chemical analysis the base is found to contain 76.60% C. and 7.68% H as compared with a theoretical analysis of 76.74% C. and 7.79% H.

EXAMPLE III

γ-Morpholinopropyl 2-phenylphenyl ether

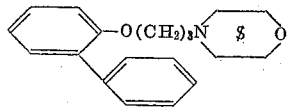

About 8.5 g. of o-hydroxydiphenyl is dissolved in 150 cc. of ethanol and refluxed with 2.8 g. of potassium hydroxide. To the foregoing solution is added dropwise 8.1 g. of γ-morpholinopropyl chloride and the mixture refluxed for about 24 hours. The cooled reaction mixture is filtered and the solvent removed by vacuum distillation. The residue is acidified, shaken with ether and made strongly alkaline with sodium hydroxide as in Example II. The dry ethereal phase is distilled to yield the base γ-morpholinopropyl 2-phenylphenyl ether having a boiling point of 200–201° C. at a pressure of 2.8 mm. On chemical analysis the base is found to contain 76.52% C. and 7.77% H as compared with a theoretical analysis of 76.74% C. and 7.79% H.

EXAMPLE IV

δ-Morpholinobutyl 4-phenylphenyl ether

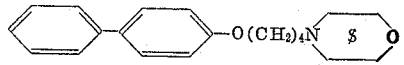

About 34 g. of p-hydroxydiphenyl and 11.2 g. of potassium hydroxide are refluxed in 250 cc. of ethyl alcohol. To the foregoing solution is added rapidly 35 g. of tetramethylene dibromide dissolved in about 50 cc. of ethyl alcohol and the mixture heated for about 4 hours. The reaction mixture is then filtered while hot and the precipitate comprising δ-diphenoxybutyl bromide recovered. To about 150 cc. of dry benzene containing 10.6 g. of δ-diphenoxybutyl bromide is added 7 g. of morpholine and the reaction mixture heated for about 7 hours. The cooled mixture is filtered and the solvent removed under reduced pressure to yield a waxy solid which upon recrystallization from petroleum solvent and drying yields the base δ-morpholinobutyl 4-phenylphenyl ether having a melting point of 58–59° C. On chemical analysis the base is found to contain 76.81% C. as compared with a theoretical analysis of 77.13% C.

EXAMPLE V

ε-Morpholinoamyl 4-phenylphenyl ether

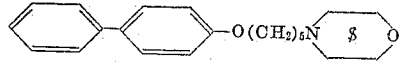

In 200 cc. of ethanol 5.6 g. of potassium hydroxide, 17.0 g. of p-hydroxydiphenyl and 18.9 g. of pentamethylene dibromide are refluxed for about 4 hours and filtered to produce ε-diphenoxyamyl bromide. About 11.3 g. of the said ε-diphenoxyamyl bromide is dissolved in 100 cc. of dry benzene and 7.0 g. of morpholine and the reaction mixture refluxed for several hours. The solution is then filtered, the solvent removed at reduced pressure and the residue which solidifies slowly on standing is thereafter recrystallized from petroleum solvent-ethanol and dried to produce the base ε-morpholinoamyl 4-phenylphenyl ether having a melting point of 60–61° C. On chemical analysis the base is found to contain 77.23% C. and 7.87% H as compared with a theoretical analysis of 77.13% C. and 8.09% H.

EXAMPLE VI

*Bis-γ-morpholinopropyl 4,4'-biphenyl ether*

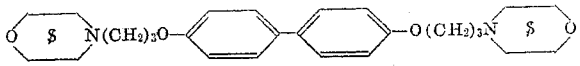

To 18.6 g. of p,p'-biphenol in 150 cc. of ethanol is added 11.2 g. of potassium hydroxide and 32.6 g. of γ-morpholinopropyl chloride and the mixture refluxed for 8 hours. The reaction mixture is filtered hot which on cooling forms a precipitate. The precipitate is dissolved in 200 cc. of ethanol, filtered and cooled. The solid is dried in a vacuum oven to yield γ-morpholinopropyl 4,4'-biphenyl ether having a melting point of 102–104° C. On chemical analysis the base is found to contain 70.56% C. and 8.55% H as compared with a theoretical analysis of 70.55% C and 8.65% H.

The compounds of the invention may also be prepared by refluxing in a dry solvent an ω-haloalkyl aryl ether with morpholine. The hydrohalide salt is then separated by suitable means and the desired ether recovered.

The ω-haloalkyl aryl ethers for the starting materials may be obtained by the usual methods, as by the reaction of the sodium salt of the aryl hydroxide with an alkyl dihalide. Similarly, the sodium salt of the aryl hydroxide may be reacted with a halohydrin, and the resulting ω-hydroxyalkyl aryl ether is further reacted with a phosphorus or thionyl halide or a halogen acid to give the desired ω-haloalkyl aryl ether. The reaction of the ω-haloalkyl aryl ether with morpholine gives the desired alkamine ether.

Still another method of preparing the compounds of the present invention comprises reacting an alkali metal in a finely divided form, such as a dispersion of sodium in toluene, with the desired aryl phenol to form the alkali metal salt of the hydroxy aryl compound and treating the said alkali metal salt with a lower alkyl dihalide, such as 1-chloro-3-bromo-propane or 1,3-dibromo-propane, to form the halide of the aryl alkyl ester and reacting the said halide with morpholine to produce the desired morpholino ether. It should be understood that in place of the alkali metal one can use an alcoholate or alkali metal hydride to prepare the alkali metal salts of the desired hydroxy aryl compound.

The salts are generally prepared by dissolving the products (which are bases) in a solvent and adding an acid, which precipitates the salt. For example, by dissolving γ-morpholinopropyl 4-phenyphenyl ether in dry ether and adding a solution of hydrochloric acid, sulfuric acid, citric acid, or picric acid, the hydrochloride, sulfate, citrate, or picrate salt, respectively of the γ-morpholinopropyl 4-phenylphenyl ether is formed. Similarly, the salts of the other named bases may be prepared.

While in the preceding specific examples of the morpholino ethers of the present invention R is shown as a bivalent hydrocarbon group having three, four, or five carbon atoms, it should be understood that other bivalent lower hydrocarbons can be used with equal facility. To prepare the corresponding lower alkylene congeners of the phenylphenyl ethers of the preceding examples, one uses in place of the γ-morpholinopropyl halide of Example I the desired ω-morpholino lower alkylene halide. In the present application it should be understood that the term "lower alkylene" is used to designate a bivalent lower hydrocarbon radical other than an alkylidene group or the like in which both valences are taken from the same carbon atom.

It should be understood that the phenylphenyl group of the compounds of the present invention may be either substituted or unsubstituted with the substituents being preferably not more than three and being either mixed or identical substituents. The substituent groups may be alkyl, alkenyl, nitro, phenyl, hydroxy, alkoxy, morpholinoalkoxy, aralkoxy, and aryloxy.

Compounds of the invention are useful as intermediates for certain organic compounds and further have utility as local anesthetics, either for surface anesthesia or in wheals for regional anesthesia. Generally, the compounds are used therapeutically in the form of inorganic or organic salts, for example, the hydrochloride, sulfate, citrate, picrate, and the like. Because of the low toxicity and low sensitizing properties of the compounds, such as γ-morpholinopropyl 4-phenylphenyl ether, and the very excellent anesthesia produced there is provided by the present invention as superior local anesthetic. Pharmaceutically useful forms of the invention are illustrated by the following specific examples:

EXAMPLE VII

A sterile anesthetic solution for irrigation is prepared by admixing the following ingredients in the proportions specified:

| | Percent |
|---|---|
| γ-Morpholinopropyl 4-phenylphenyl ether HCl | 1.0 |
| Benzyl alcohol | 0.9 |
| Water for injection, q. s. | |

EXAMPLE VIII

A highly effective anesthetic jelly is prepared by combining the following ingredients in the specified proportions:

| | Percent |
|---|---|
| γ-Morpholinopropyl 4-phenylphenyl ether·HCl | 1.0 |
| Methocel | 4.25 |
| Propylene glycol | 20.0 |
| Distilled water, q. s. | |

EXAMPLE IX

A highly effective anesthetic cream in a water miscible base is prepared by combining the following ingredients in the specified proportions:

| | Percent |
|---|---|
| γ-Morpholinopropyl 4-phenylphenyl ether | 1.0 |
| Propylene glycol | 57.0 |
| Carbowax-6000 | 42.0 |

It should also be understood that compounds of the present invention can be prepared in the form of anesthetic lotions, such as incorporating 1% of the γ-morpholinopropyl 4-phenylphenyl ether hydrochloride in a calamine, zinc oxide suspension. It is also possible, if desired, to prepare compounds of the present invention dispersed in a solid carrier, such as cocoa butter and spermaceti. In each of the foregoing pharmaceutical preparations it is also possible to incorporate other medicaments therewith, such as an antihistaminic, or sulfa drugs, such as sulfadiazine.

This application is a continuation-in-part of applicants' now abandoned co-pending application Serial No. 187,666, filed September 29, 1950.

Others may readily adapt the invention for use under various conditions of service, by employing one or more of the novel features disclosed or equivalents thereof. As at present advised with respect to the apparent scope of our invention, we desire to claim the following subject matter.

We claim:

1. A compound selected from the class consisting of compounds having the general formula

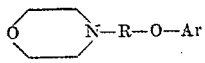

wherein R is a divalent lower saturated aliphatic hydrocarbon group having at least 2 carbon atoms in the carbon chain, and Ar is a group selected from the class consisting of a phenylphenyl, and an N-morpholino lower alkylene substituted phenylphenyl, and the salts thereof.

2. The ω-N-morpholino-lower alkylene phenyl ether having the phenyl ring substituted by a phenyl group wherein the said alkylene group has at least 2 carbon atoms in the carbon chain.

3. The acid addition salt of an ω-N-morpholino-lower alkylene phenyl ether having the phenyl ring substituted by a phenyl group wherein the said alkylene group has at least 2 carbon atoms in the carbon chain.

4. The ω-N-morpholino-lower alkylene phenylphenyl ether wherein the said alkylene group has at least 2 carbon atoms in the carbon chain.

5. The acid addition salt of an ω-N-morpholino-lower alkylene phenylphenyl ether wherein the said alkylene group has at least 2 carbon atoms in the carbon chain.

6. The γ-N-morpholinopropyl phenylphenyl ether.

7. The acid addition salt of a γ-N-morpholino phenylphenyl ether.

8. The hydrochloride salt of a γ-N-morpholinopropyl phenylphenyl ether.

9. The compound γ-N-morpholinopropyl 4-phenylphenyl ether.

10. The hydrochloride salt of γ-N-morpholinopropyl 4-phenylphenyl ether.

11. The compound γ-N-morpholinopropyl 3-phenylphenyl ether.

12. The compound γ-N-morpholinoamyl 4-phenylphenyl ether.

13. The compound γ-N-morpholinopropyl 4,4'-biphenyl ether.

14. A process of preparing a compound having the general formula

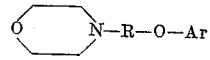

wherein R is a divalent lower aliphatic hydrocarbon group having at least 2 carbon atoms in the carbon chain, and Ar is a group selected from the class consisting of a phenylphenyl, and an N-morpholino lower alkylene substituted phenylphenyl; which comprises reacting a metal hydroxide in a lower aliphatic alcohol solvent with an Ar hydroxide compound, and reacting the resultant metal salt of the Ar hydroxide compound with an ω-N-morpholino lower alkyl halide to produce the corresponding ether of ω-N-morpholino lower alkanol.

15. The process which comprises refluxing potassium hydroxide in a lower aliphatic alcohol solvent and 4-hydroxydiphenyl, and adding γ-N-morpholinopropyl chloride to the refluxing mixture to produce γ-N-morpholinopropyl 4-phenylphenyl ether.

References Cited in the file of this patent

UNITED STATES PATENTS 2,484,621    Hardman _____ Oct. 11, 1949
2,679,501    Wenner _____ May 25, 1954

FOREIGN PATENTS 130,555    Australia _____ Nov. 28, 1946

OTHER REFERENCES

Idson: Chemical Reviews, vol. 47, number 3, pages 419–420, Sept. 12, 1950.